United States Patent [19]

Kuisma

[11] Patent Number: 4,875,134
[45] Date of Patent: Oct. 17, 1989

[54] PRESSURE SENSOR CONSTRUCTION AND METHOD FOR ITS FABRICATION

[75] Inventor: Heikki Kuisma, Helsinki, Finland

[73] Assignee: Vaisala Oy, Helsinki, Finland

[21] Appl. No.: 294,799

[22] Filed: Jan. 9, 1989

[30] Foreign Application Priority Data

Jan. 18, 1988 [FI] Finland .................................. 880206

[51] Int. Cl.$^4$ .......................... H04G 7/00; G01L 9/12
[52] U.S. Cl. .................................. 361/282; 29/25.42; 73/718
[58] Field of Search ................... 361/283; 73/718, 724; 29/25.42; 204/16

[56] References Cited

U.S. PATENT DOCUMENTS

| | | | |
|---|---|---|---|
| 4,495,820 | 1/1985 | Shimada et al. | 73/724 |
| 4,594,639 | 6/1986 | Kuisma | 361/283 |
| 4,597,027 | 6/1986 | Lehto | 361/283 |
| 4,609,966 | 9/1986 | Kuisma | 361/283 |
| 4,625,561 | 12/1986 | Mikkor | 73/724 |
| 4,730,496 | 3/1988 | Knecht et al. | 73/724 |
| 4,773,972 | 9/1988 | Mikkor | 204/16 |

Primary Examiner—Donald A. Griffin
Attorney, Agent, or Firm—Birch, Stewart, Kolasch & Birch

[57] ABSTRACT

This invention concerns a capacitive pressure sensor construction and method for fabricating said sensor. The pressure sensor construction comprises a base part (1, 2, 4), comprising an electrically conductive silicon layer (1, 2) and a thereupon permanently bonded planar intermediate layer (4) of an insulating material with an essentially smaller thickness than that of the silicon layer (1, 2); a fixed planar capacitor electrode (9) fabricated on the base part (1, 2, 4); and a deflecting membranous capacitor electrode (6) fabricated of silicon and integral with a surrounding, essentially thicker base element (5), and gappedly spaced from and aligned at least approximately coincident with the fixed capacitor electrode (9), so that a hermetically sealed chamber (25) remains between the fixed electrode (9) and the membranous electrode (6). According to the invention, the base part (1, 2, 4) is perpendicularly divided into areas (1, 2) galvanically isolated from each other, namely to a contact area (2), which is coincident with the fixed capacitor electrode (9), galvanically connected to said electrode and designed with an area maximally equal to that of said electrode, and to at least one bonding area (1), which is isolated from the contact area (2) by an insulating layer (3) and to which a bonding voltage can be applied during the anodic bonding process in order to bond the base part to the base element (5) of the membranous capacitor electrode. The construction avoids stray capacitances at bonding area.

8 Claims, 4 Drawing Sheets

PRESSURE SENSOR CONSTRUCTION AND METHOD FOR ITS FABRICATION

BACKGROUND OF THE INVENTION

The present invention relates to a pressure sensor construction which includes a fixed planar capacitor and a deflecting membrane capacitor.

FIELD OF THE INVENTION

The invention also concerns a method for producing said pressure sensor construction.

Known from U.S. patent publication No. 4 597 027 and U.S. patent publication No. 4 609 966 is a capacitive pressure sensor construction with silicon/glass structure, in which construction the silicon element with its center area thinned into a membrane is attached by anodic bonding to a glass layer deposited on top a second silicon element so that there remains a shallow, hermetically closed, gapped space between these two parts. The fixed planar capacitor electrode, which is placed on the glass layer in the gapped space, is electrically contacted to the second silicon element. The thinned silicon membrane serves as the other, pressure-deflected capacitor electrode.

Disadvantages of the prior art construction are:

1. A stray capacitance is formed across the glass layer at the areas bonding the elements, which capacitance is effectively coupled in parallel with the measured sensor capacitance.
2. A voltage of several hundreds of volts is applied in the anodic bonding process between the silicon elements. The same voltage is also effective over all capacitors of sensor items contained on the silicon wafer. Because the width of the dielectric gap is only in the order of a few micrometers, there is a high probability of electrical break-through. Thence, extremely high cleanliness and smoothness is required from all surfaces in the process.
3. Readily bondable contact areas are available only on the glass surface. Higher packing density or protection of contacts, however, occasionally makes it preferable to place the bonding areas on the sensor's lower surface.

SUMMARY AND OBJECTS OF THE INVENTION

The aim of the present invention is to overcome the disadvantages of the prior art technology and achieve a totally new kind of pressure sensor construction and method for fabricating the sensor.

The invention is based on dividing the silicon wafer acting at the sensor substrate into galvanically isolated subareas so that each fixed electrode of the sensor capacitor is provided with a dedicated contact area, galvanically connected to the capacitor electrode and surrounded by a bonding area, the contact area being galvanically isolated from the bonding area to which a high bonding voltage is applicable during the anodic bonding process.

More specifically, the pressure sensor in accordance with the invention is characterized by what is stated in the characterizing part of claim 1.

Correspondingly, the method in accordance with the invention is characterized by what is stated in the characterizing part of claim 4.

The invention provides outstanding benefits.

The construction according to the invention avoids stray capacitances at the bonding areas, because the contact area of the substrate can be designed small. Further, the high voltage required in anodic bonding can be decoupled from the capacitor dielectric gap by arranging a galvanic isolation between the bonding area of the substrate and the capacitor area. Furthermore, electrical bonding to the sensor electrodes is also feasible at the lower side of the sensor construction.

BRIEF DESCRIPTION OF THE DRAWINGS

The invention is next examined in detail with help of the following exemplifying embodiments illustrated in the attached drawings.

FIG. 1b is a sectional view taken along plane A—A of the sensor construction illustrated in FIG. 1a.

FIG. 3b is a bottom view of the sensor construction illustrated in FIG. 3a.

FIG. 3c is a sectional view taken along plane B—B of the sensor construction illustrated in FIG. 3a.

FIG. 4b is a sectional view taken along plane C—C of the sensor construction illustrated in FIG. 4a.

DETAILED DESCRIPTION OF THE PREFERRED EMBODIMENTS

Figure 1A:
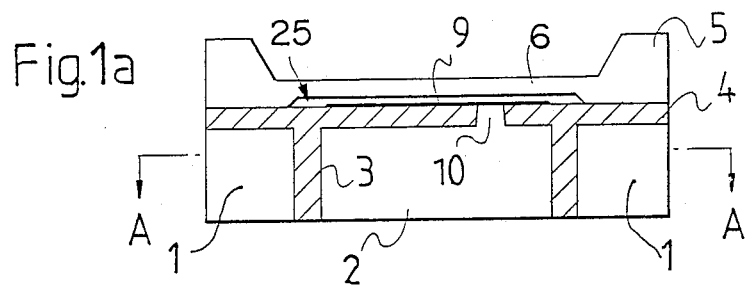
FIG. 1a is a sectional side view of a sensor construction in accordance with the invention.
Figure 1B:
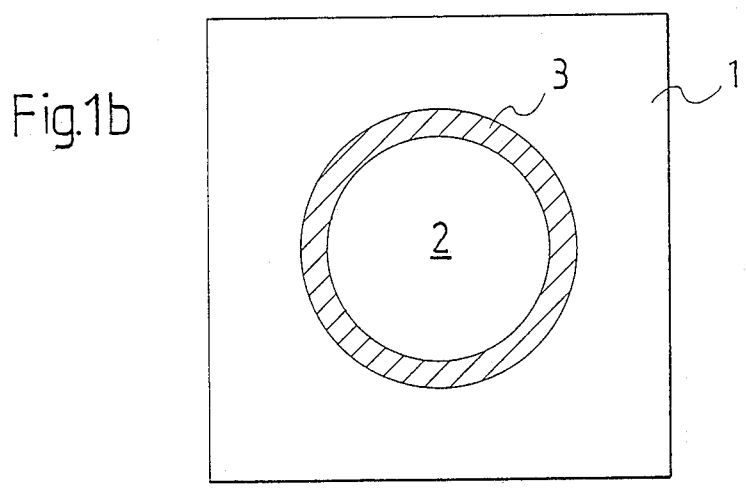

FIGS. 1a and 1b show a feasible embodiment of the sensor construction. The construction has a silicon base part 1, 2 divided with a tubular glass isolator 3 into two sections, namely a bonding section 1 and a cylindrical contact section 2. The top side of the sections 1 and 2 is covered by a glass layer 4. The contact section 2 communicates with a fixed planar capacitor electrode 9, which is deposited on the glass isolation layer 4, via a silicon bump 10. Anodic bonding is made to the glass layer 4 where the glass layer 4 meets the bonding section 1. The sensor capacitance is measured between the contact section 2 and a silicon base element 5. The bonding section 1 is connected to ground potential, whereby the use of a suitable measurement configuration eliminates the effect of stray capacitance formed across the glass layer 4. The voltage required in the anodic bonding process of sensor fabrication is applied between the bonding section 1 and the body element 5, thus being effectively decoupled from the dielectric gap between the capacitor electrodes 6 and 9. A hermetically sealed chamber 25 is formed between the capacitor electrodes 6 and 9.

Figure 2:
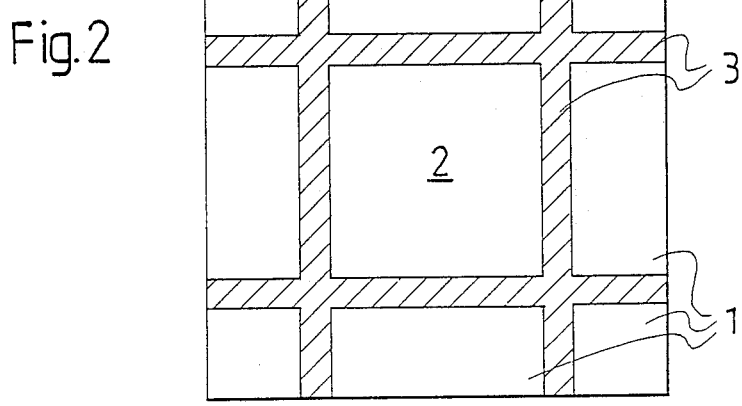
FIG. 2 is a bottom view of a second sensor construction in accordance with the invention.

The glass pattern 3 isolating the sections 1 and 2 may be shaped into the form of perpendicularly intersecting strips as illustrated in FIG. 2, or into an alternative shape. In the embodiment shown in FIG. 2, the contact section 2 becomes the shape of a parallelepiped. The choice of an insulator pattern is mainly determined by fabrication method used. Variations in the area of the bare silicon section 2 are also feasible.

Figure 3A:
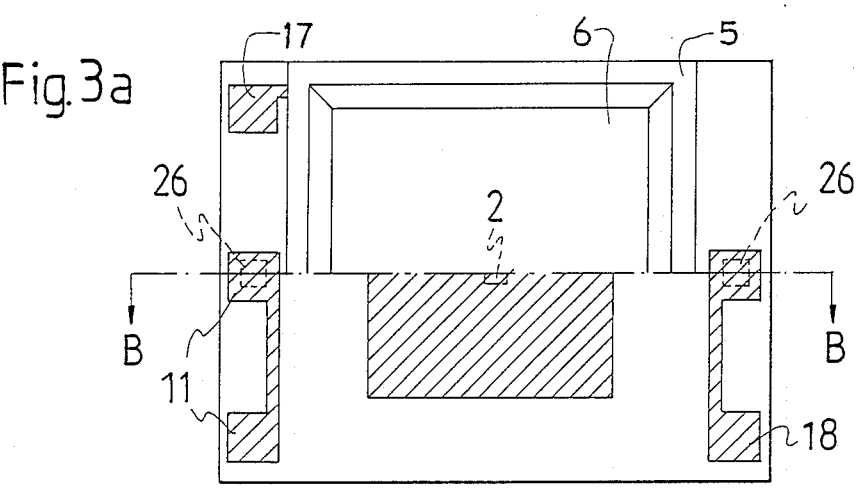
FIG. 3a is a partially sectioned top view of a third sensor construction in accordance with the invention.
Figure 3B:
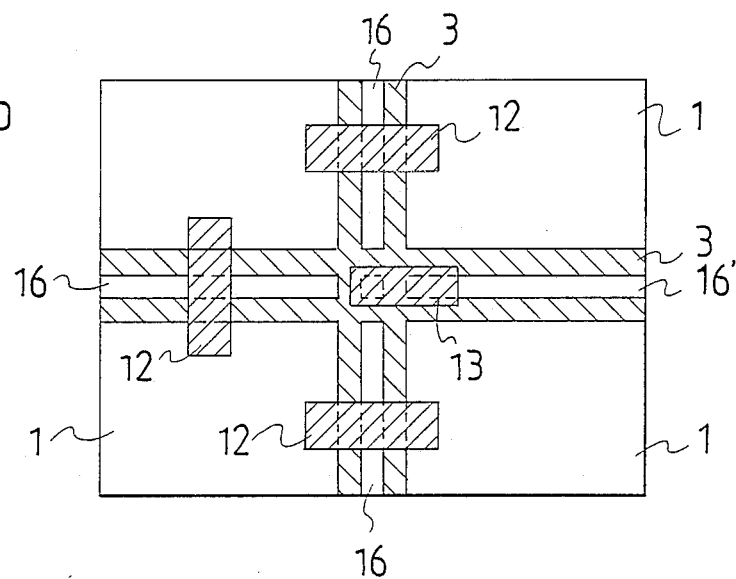
Figure 3C:
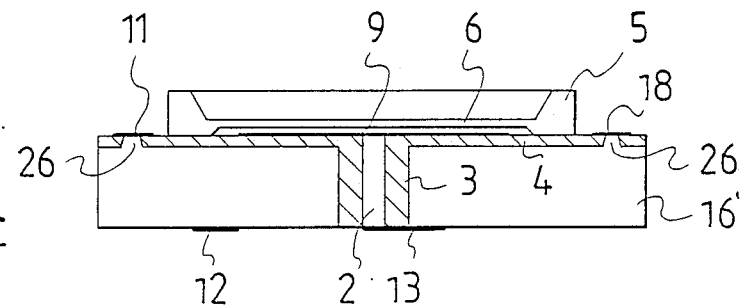

A third feasible embodiment of the sensor construction is illustrated in detail in FIGS. 3a-3c. According to FIG. 3c, the silicon area 2 acting as the contact area is a column, which is surrounded by elongated vertical glass layers 3 and is electrically communicating with a fixed planar capacitor electrode 9. The glass layers additionally border eight other silicon areas 1, 16, and 16'. The silicon area 16 is connected to the silicon area 2 via a metallized thin-film conductor 13 fabricated on the lower surface of the sensor. The other silicon areas are correspondingly connected to each other by metallic conductor patterns 12. Electrical contacts are routed through the glass layer 4 to the upper surface of the sensor by means of silicon bumps 26. The metallized area 11 is grounded, and the sensor capacitance is measured across metallized areas 17 and 18.

Figure 4A:
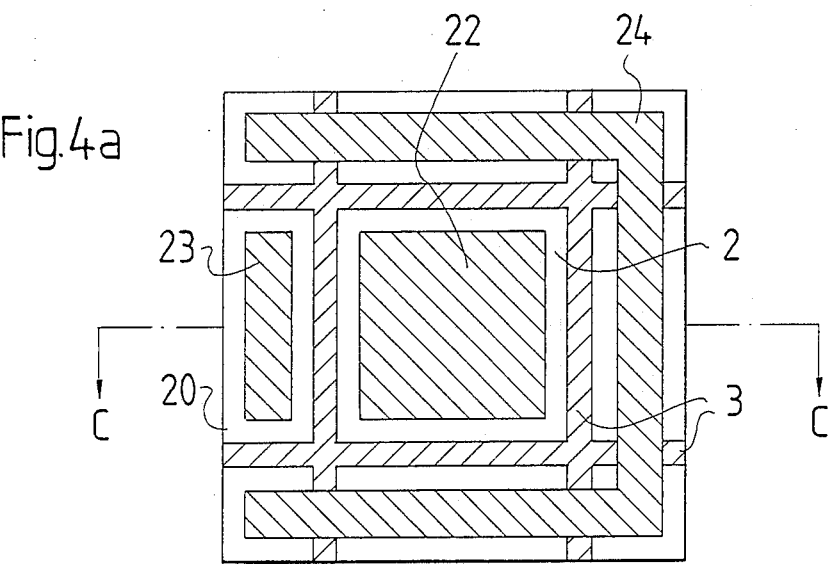
FIG. 4a is a bottom view of a fourth sensor construction in accordance with the invention.
Figure 4B:
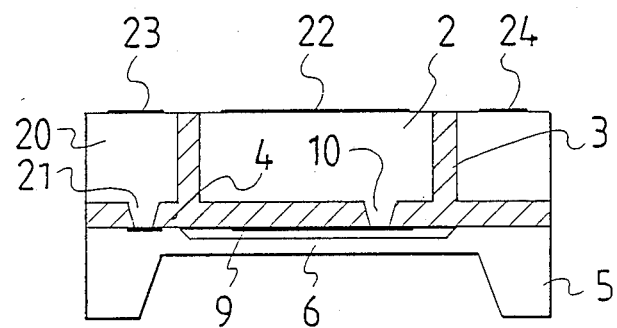

Shown in FIGS. 4a and 4b is a sensor construction, in which the contact areas are routed to the lower surface of the sensor. FIG. 4b shows an upside down inverted sectional view taken along plane C—C of the sensor construction illustrated in FIG. 4a. In addition to the contact area 2, the illustrated embodiment utilizes another insulated silicon area 20, which communicates electrically via a silicon bump 21 extending through the glass layer 4, with a silicon element 5 and further with a silicon membrane 6, which provides for the second capacitor electrode. The lower side of the sensor is provided with thin-film metallized areas 22, 23, and 24, on which conductor bonding is made by soldering, welding or a similar method. The area 22 is connected to the silicon area 2, area 23 to the silicon area 20, and area 24 to the rest of the silicon areas. The sensor capacitance is measurable across the areas 22 and 23 when the areas 24 are connected to ground potential in the measurement configuration.

The thickness of the glass layer 3 may be 10-500 μm, preferably 150 μm. The thickness of the glass layer may be 1-150 μm, preferably 30 μm.

Figure 5:
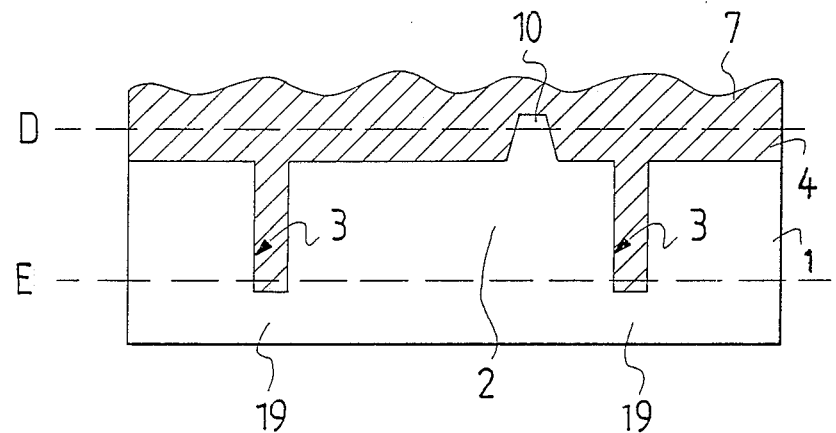
FIG. 5 shows a production stage of the sensor construction in accordance with the invention.

The structure illustrated in the examples can be fabricated according to FIG. 5 as follows:
- the silicon surface is etched or otherwise processed to obtain silicon bumps 10, which are required to extend through the glass layer 4;
- the silicon wafer is processed for deep, narrow grooves 3 with a sufficient depth to nearly separate the silicon areas from each other. The areas remain connected to each other by isthmuses 19 at the bottom of the silicon wafer. The shape and dimensions of the areas and grooves are determined by the processing method used for fabricating the grooves 3. Applicable methods are, e.g., drilling with a hollow drill, etching, laser machining, spark erosion and sawing. Among the mentioned methods, the three latter are especially viable. Sawing effortlessly produces narrow grooves, which, however, divide the wafer into unnecessary many chips. On the other hand, laser machining requires accurate depth control;
- glass powder 7 is spread over the silicon surface and melted until the glass fills the grooves;
- the glass surface is honed down to a level, e.g., marked approximately as level D, so as to expose the silicon bumps but yet retaining a glass layer 4 of desired thickness on the other areas;
- silicon is honed away from the lower side of the wafer down to a level, e.g., marked approximately as level E, until the isthmus 19 is removed and the silicon chips are separated from each other;
- the glass surface is polished.

The described construction and method is readily developed into several variations. Characteristic to the method is that a single wafer of the base material is processed into a wafer containing several parts isolated from each other. The fabrication method is characterized by the nearly completed separation of the chips on the wafer from each other, a subsequent glass melting phase, and a final separation of the chips from the wafer. This approach maintains the planar shape of the base material wafer and the dimensional accuracy of the elements. Alternatively, a feasible approach is to mount the base material wafer rigidly to another support wafer 27 in accordance with FIG. 6 so that the grooves may be machined entirely penetrating the base material wafer. After the melting and glass honing phases, the support wafer is detached.

In a completed pressure sensor construction, the mutually isolated elements of the sensor chip can be used as feedthrough elements in a variety. The sensor construction illustrated in FIGS. 3a-3c gives an example of this possibility.

What is claimed is:

1. A capacitive pressure sensor construction comprising
   a base part (1, 2, 4), comprising a planar, electrically conductive silicon layer (1, 2) and a thereupon permanently bonded planar intermediate layer (4) of an insulating material, e.g., glass, with an essentially smaller thickness than that of the silicon layer (1, 2),
   a fixed planar capacitor electrode (9) fabricated on the base part (1, 2, 4), and
   a deflecting membranous capacitor electrode (6) fabricated of silicon and essentially integral with a surrounding, essentially thicker base element (5), and gappedly spaced from and aligned at least approximately coincident with the fixed capacitor electrode (9), so that a hermetically sealed chamber (25) remains between the fixed electrode (9) and the membranous electrode (6),
   characterized in that
   the base part (1, 2, 4) is perpendicularly divided into areas (1, 2) galvanically isolated from each other, namely to a contact area (2), which is coincident with the fixed capacitor electrode (9), galvanically connected to said electrode and designed with an area maximally equal to that of said electrode, and to at least one bonding area (1), which is isolated from the contact area (2) by an insulating layer (3) and to which a bonding voltage can be applied during the anodic bonding process in order to bond the base part to the base element (5) of the membranous capacitor electrode.

2. A pressure sensor construction as claimed in claim 1, characterized in that the contact area (2) is shaped as a cylinder.

3. A pressure sensor construction as claimed in claim 1, characterized in that the contact area (2) is shaped as a parallelepiped.

4. A method for dividing an electrically conductive silicon wafer used in the fabrication of a capacitive pressure sensor into galvanically isolated subareas (1, 2), characterized in that
   perpendicularly penetrating grooves (3), which define integral subareas (1, 2), are formed into a silicon base material wafer with a depth extending below the lower surface level (E) of the final base part, the grooves are filled with an insulating material (7), e.g., glass, the insulating material (7) is brought by, e.g., heating into such a state that makes the insulating material (7) adhere to the surrounding base material, and the lower surface of the base part is processed to a predetermined level (E).

5. A method as claimed in claim 4, characterized in that the grooves (3) are fabricated by drilling with a hollow drill.

6. A method as claimed in claim 4, characterized in that the grooves (3) are fabricated by laser machining.

7. A method as claimed in claim 4, characterized in that the grooves (3) are fabricated by sawing.

Figure 6:
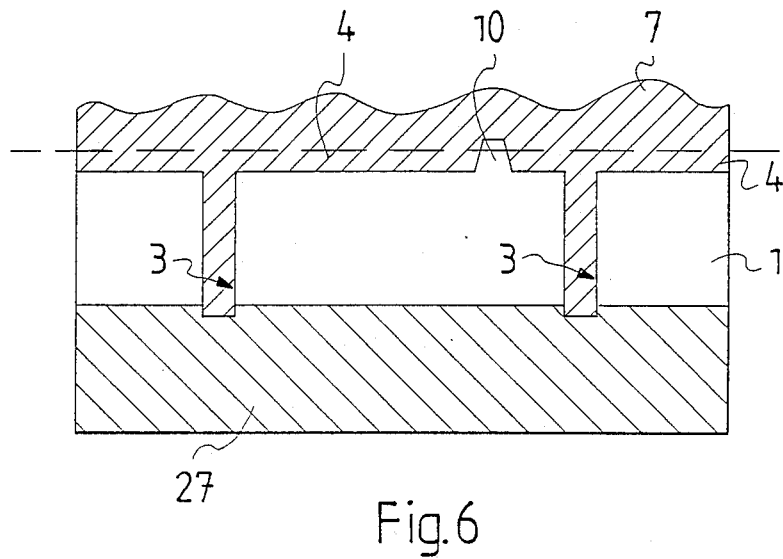
FIG. 6 shows a production stage of the second sensor construction in accordance with the invention.

8. A method as claimed in any one of claims 4, 5, 6, and 7, characterized in that prior to machining the grooves (3), the substrate wafer is mounted on a separate support wafer (27) (FIG. 6).

* * * * *